United States Patent [19]

Schroeder

[11] 4,008,439
[45] Feb. 15, 1977

[54] PROCESSING OF TWO NOISE CONTAMINATED, SUBSTANTIALLY IDENTICAL SIGNALS TO IMPROVE SIGNAL-TO-NOISE RATIO

[75] Inventor: Manfred Robert Schroeder, Gottingen, Germany

[73] Assignee: Bell Telephone Laboratories, Incorporated, Murray Hill, N.J.

[22] Filed: Feb. 20, 1976

[21] Appl. No.: 659,700

[52] U.S. Cl. .............................. 328/163; 325/474; 325/477; 179/1 P; 328/167
[51] Int. Cl.² ........................................ H03B 1/04
[58] Field of Search ............... 328/163; 179/1 P; 325/367, 369, 474, 475, 476, 477

[56] References Cited
UNITED STATES PATENTS

| | | | |
|---|---|---|---|
| 3,644,674 | 2/1972 | Mitchell et al. | 179/1 P |
| 3,652,939 | 3/1972 | Levasseur | 325/367 |
| 3,728,634 | 4/1973 | Watkinson | 324/474 X |
| 3,737,783 | 6/1973 | Oswald et al. | 325/367 |
| 3,869,673 | 3/1975 | Close | 328/163 |
| 3,911,369 | 10/1975 | Seidel | 328/163 |
| 3,943,468 | 3/1976 | Cox et al. | 325/475 |

Primary Examiner—John S. Heyman
Attorney, Agent, or Firm—H. L. Logan

[57] ABSTRACT

When two substantially identical signals contaminated by uncorrelated noise are received over two channels, combining of the contaminated signals in a linear manner results in a maximum signal-to-noise ratio improvement of 3 dB. The present disclosure relates to combining such contaminated signals through a process whose parameters vary as short time functions of the signal and noise powers in each channel. This processing produces a signal-to-noise ratio improvement which is greater than that achievable through linear processing.

6 Claims, 7 Drawing Figures

PROCESSING OF TWO NOISE CONTAMINATED, SUBSTANTIALLY IDENTICAL SIGNALS TO IMPROVE SIGNAL-TO-NOISE RATIO

BACKGROUND OF THE INVENTION

1. Field of the Invention

This invention relates to processing a pair of substantially identical signals contaminated by uncorrelated noise to produce a like signal with an improved signal-to-noise ratio.

2. Description of the Prior Art

When two substantially identical signals contaminated by uncorrelated noise are received over two channels, a like signal with an improved signal-to-noise ratio (SNR) can be realized by linearly combining the contaminated signals. This may be appreciated by considering the following "left" and "right" contaminated signals $$l = s + n_l, \text{ and}$$

$$r = s + n_r, \text{ respectively,}$$

where $s$ is the signal amplitude (with power S), $n_l$ is a "left" noise amplitude (with power L), and $n_r$ is a "right" noise amplitude (with power R). The SNRs of these two contaminated signals are $$SNR_l = S/L \text{ and}$$

$$SNR_r = S/R, \text{ respectively.}$$

The average of the two contaminated signals $(l + r)/2$ has a signal power S and, if the two noises are uncorrelated, a noise power of $(R + L)/4$. The SNR of the average channel output is, therefore, $$SNR_a = 4 (S/L+R).$$

If the two uncorrelated noises have equal power (L = R), then $$SNR_a = 2 (S/L),$$

a situation usually referred to as a "3-dB improvement in SNR." This 3-dB gain in SNR is in fact the maximum achievable through linear processing.

By contrast, a human listener seems to be able to do much better when processing his two-channel ear inputs. If human performance is measured by speech intelligibility, for example, binaural performance may exceed monaural performance (of the "better" ear if they are different) by as much as 12 dB or more. This has often been referred to colloquially as the "cocktail-party" effect which derives its name from the ability to pick out a single talker from a loud babble of spatially dispersed voices — a situation frequently encountered at cocktail parties. The fact that a human can understand speech under such circumstances, implies binaural signal-processing capabilities which go far beyond the 3-dB improvement obtainable from linear processing. Technically this phenomenon is often referred to as "binaural release from masking" and is measured by the "binaural masking level difference" (BMLD). What nonlinear processes a human uses to accomplish this feat, however, is not known in any detail, although "contra-lateral" neural inhibition and excitation processes in the auditory pathways between the ears and the human auditory cortex are probably involved.

SUMMARY OF THE INVENTION

An oject of the present invention is to process two substantially identical signals, which are each contaminated by uncorrelated noise, to produce an output having a signal-to-noise ratio improvement greater than that achievable through linear processing.

This and other objects of the invention are achieved by summing weighted values of the two contaminated signals. In accordance with the invention, the weighting factors comprise combinations of moving averages of magnitudes related to the contaminated signals. In particular, the instantaneous amplitude $r$ of a first contaminated signal is multiplied by a weighting factor equal to $$\frac{\overline{rl} \, (\overline{l^2} - \overline{rl})}{\overline{r^2} \, \overline{l^2} - (\overline{rl})^2},$$

where $l$ is the second contaminated signal instantaneous amplitude and the bars indicate moving averages of the values under them. Similarly, the instantaneous amplitude of the second contaminated signal is multiplied by a weighting factor equal to $$\frac{\overline{rl} \, (\overline{r^2} - \overline{rl})}{\overline{r^2} \, \overline{l^2} - (\overline{rl})^2}.$$

These two weighting factors are functions of $r$ and $l$ and consequently are continuously changing in value. This process, which is not a linear one, results in a signal-to-noise ratio greater than that achievable with linear processing.

One possible use for an embodiment of the invention is in a speakerphone. Echo and other noises in a room are generally picked up by a speakerphone and are very objectionable to the listener at the other end of the line. By using a pair of microphones with the user of the speakerphone substantially equally spaced between them and furthermore, an embodiment of the invention to process the microphone outputs, a substantial signal-to-noise improvement can be realized before transmitting to the listener. When the user is not equally spaced between the microphones, delay and amplifying devices may be employed in a conventional manner to produce substantially identical input signals to the embodiment of the invention. These devices may be constructed in accordance with known techniques to produce a desired delay or amplifying versus frequency characteristic.

Embodiments of the invention are not restricted to use in the audio frequency band but may be used at frequencies below and above this band. Furthermore, such embodiments may be of either an analog or a digital form so as to be operative on either analog or digitally encoded signals.

DETAILED DESCRIPTION

Figure 1:
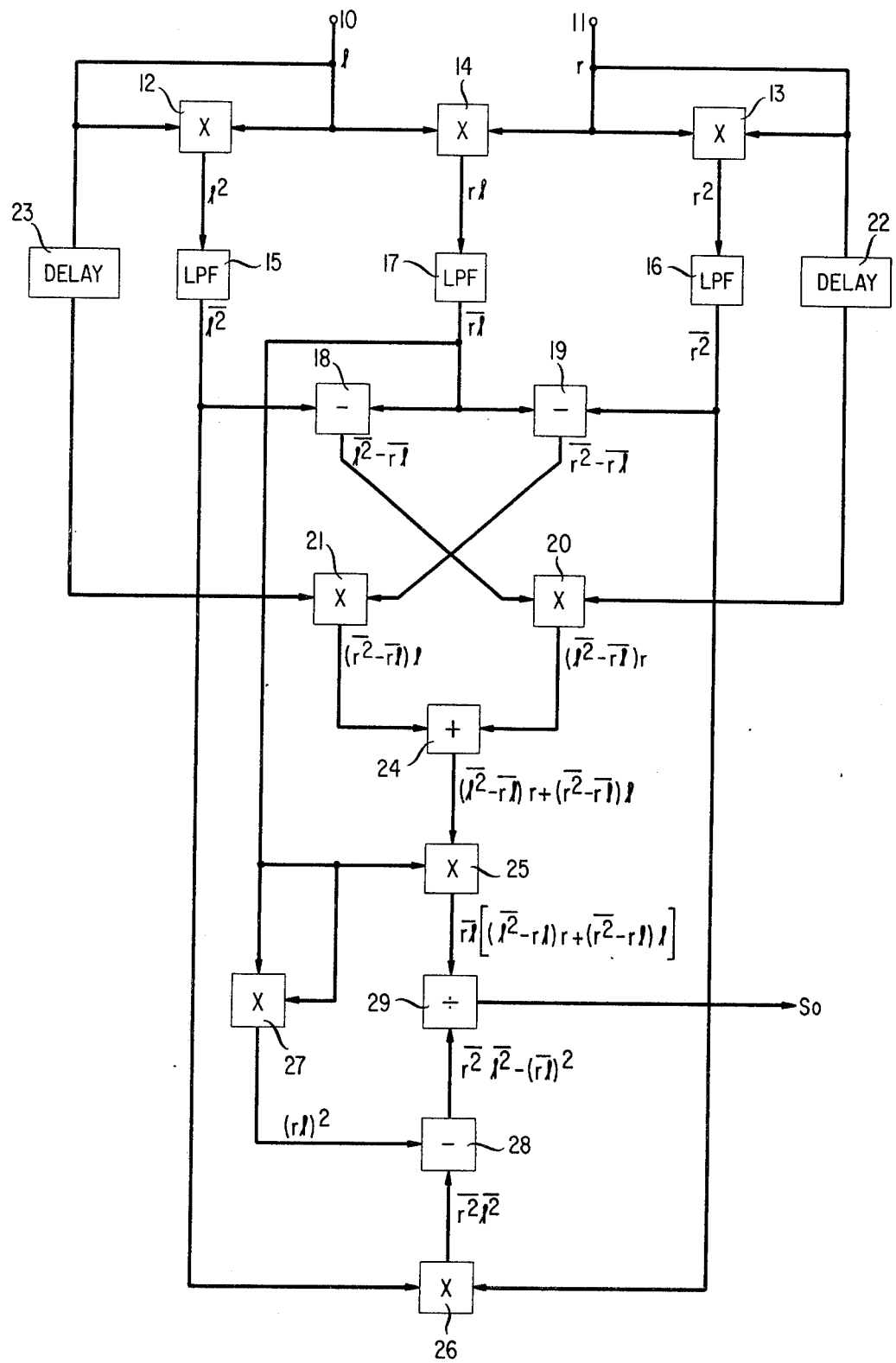
FIGS. 1 and 2 are block diagrams representing embodiments of the invention.

The symbols and bars used in the following discussion have been defined in the previous discussion. In brief, $s$ = signal amplitude, $S$ = signal power, $n_l$ and $n_r$ = left and right channel noise amplitudes, respectively, $L$ and $R$ = left and right channel noise powers, respectively, $l = s + n_l$, $r = s + n_r$ and the bars indicate moving averages of the values under them.

If $s$, $n_l$, and $n_r$ are uncorrelated, have zero-mean Gaussian values defined by $$\overline{s} = \overline{n_l} = \overline{n_r} = 0; \overline{sn_r} = \overline{sn_l} = \overline{n_l n_r} = 0,$$

and are of known powers $$\overline{s^2} = S, \overline{n_l^2} = L, \overline{n_r^2} = R,$$

then the signal amplitude $s$ and the sum $\sigma = r+l$ and difference $\delta = r-l$ have the following covariance matrix:

$$\text{cov}(s, \sigma, \delta) = \begin{pmatrix} S & 2S & 0 \\ 2S & 4S+R+L & R-L \\ 0 & R-L & R+L \end{pmatrix}. \quad (1)$$

When its inverse is called $\mu_{ik}$, the joint distribution of $(s, \sigma, \delta)$ is given by the probability density function $$p(s, \sigma, \delta) = (2\pi)^{-3/2}|\mu|^{-1/2} \exp[-1/2 \\ (\mu_{11}s^2 + 2\mu_{12}s\sigma + 2\mu_{13}s\delta + \mu_{22}\sigma^2 + 2\mu_{23}\sigma\delta + \mu_{33}\delta^2)]. \quad (2)$$

The corresponding conditional probability distribution $p(s\, \alpha, \delta)$ for $s$, given $\sigma$ and $\delta$, differs from expression (2) only by a factor which does not depend on $s$. With this in mind the expression $$\frac{d}{ds} \ln p\left(s \mid \sigma, \delta\right) = \frac{d}{ds} \ln p(s, \sigma, \delta) = -\mu_{11}s - \mu_{12}\sigma - \mu_{13}\delta \quad (3)$$

may be written. By setting expression (3) equal to zero, the most likely value of $s$ is found to be $$s_o = -(\mu_{12}\sigma + \mu_{13}\delta)/\mu_{11}. \quad (4)$$

With the $\mu_{ik}$ computed from expression (1), expression (4) becomes $$s_o = \frac{(L+R)\sigma/2 + (L-R)\delta/2}{(L+R) + (LR/S)}. \quad (5)$$

When the two noise powers are equal to one another so that $R = L$, expression (5) becomes $$s_o = \frac{1}{1 + L/2S}\left(\frac{\sigma}{2}\right).$$

Three things should be noted, namely:
a. when the noise power $L \neq 0$, $\sigma/2$ is multiplied by less than one,
b. when the noise power $L = 0$, $\sigma/2$ is multiplied by one, and
c. when the signal power $S \to 0$, the resulting signal $s_o \to 0$.

When $R \neq L$, the difference signal $\delta$ enters into $s_o$. The effect of this is best seen by reintroducing the left and right channel components for $\sigma$ and $\delta$ in expression (5) to produce $$s_o = \frac{(Lr) + (Rl)}{(L+R) + (LR/S)}. \quad (6)$$

Three things should again be noted:
a. when noise power $R = 0$, then $s_o = r$, which equals $s$,
b. when noise power $L = 0$, then $s_o = l$, which equals $s$, and
c. when noise power $S \to 0$, then $s_o \to 0$.

This may be better appreciated by rewriting expression (6) as follows:

$$s_o = \frac{S}{S + RL/(R+L)}\left[\left(\frac{L}{L+R}\right)r + \left(\frac{R}{L+R}\right)l\right]. \quad (6a)$$

In accordance with the present invention, values for $S$, $L$ and $R$ are estimated from the noise contaminated signals as follows:

$S + R$ = the infinite-time average of $r^2$,
$S + L$ = the infinite-time average of $l^2$, and
$S$ = the infinite-time average of $rl$.

Obtaining the infinite-time averages of these values is, of course, not physically possible. It is, however, physically possible to obtain short-time moving averages of the values.

In accordance with the invention, short-time moving averages are used. Notwithstanding the fact that some degradation in the final signal-to-noise ratio was anticipated because of this "compromise", investigations with the short-time averages resulted in ratios greater than those expected for infinite-time averages. This is discussed later.

When the short-term moving average values are applied to expression (6), that expression becomes $$s_o = \overline{rl}\left[\frac{(\overline{l^2} - \overline{rl})r + (\overline{r^2} - \overline{rl})l}{\overline{r^2}\,\overline{l^2} - (\overline{rl})^2}\right]. \quad (7)$$

Expression (7) may also be written as $$s_o = \left[\frac{\overline{rl}\,(\overline{l^2} - \overline{rl})}{\overline{r^2}\,\overline{l^2} - (\overline{rl})^2}\right]r + \left[\frac{\overline{rl}\,(\overline{r^2} - \overline{rl})}{\overline{r^2}\,\overline{l^2} - (\overline{rl})^2}\right]l. \quad (7a)$$

Expression (7a) is in a form which immediately demonstrates that the most likely value $s_o$ is the sum of weighted values of the two contaminated signals. Furthermore, it immediately demonstrates that the weighting factors are nonfixed quantities made up of the contaminated signals.

FIG. 1 shows a block diagram representative of an embodiment of the invention constructed in accordance with expressions (7) and (7a). A pair of input ports 10 and 11 are provided for receiving a pair of left and right channel signals, respectively, which signals are contaminated by uncorrelated noise. The contaminated left and right channel signals have instantaneous amplitudes $l$ and $r$, respectively. The left channel contaminated signal is applied to both inputs of a multiplier 12 which produces an output whose amplitude is $l^2$. Similarly, the right channel contaminated signal is applied to both inputs of a multiplier 13 to produce an output whose amplitude is $r^2$. The contaminated left and right channel signals are also applied to inputs of a multiplier 14 which produces an output having an amplitude $rl$. These three multiplier outputs are passed through low pass filters 15, 16 and 17, respectively, to produce moving average outputs having amplitudes $\overline{l^2}$, $\overline{r^2}$ and $\overline{rl}$, respectively.

The next step is the subtraction of the output of filter 17 from the outputs of filters 15 and 16 in substractors 18 and 19 to produce a pair of outputs having amplitudes equal to $(\overline{l^2} - \overline{rl})$ and $(\overline{r^2} - \overline{rl})$, respectively. The outputs of subtractors 18 and 19 are then multiplied, in multipliers 20 and 21, by the amplitudes of delayed contaminated right and left channel signals, respectively. Delay devices 22 and 23 provide delays to compensate for delays introduced by filters 15, 16 and 17. The outputs of multipliers 20 and 21 are then summed in summer 24 to produce $(\overline{l^2} - \overline{rl})l + (\overline{r^2} - \overline{rl})r$, which is then multiplied, in a multiplier 25, by $\overline{rl}$. This results in the numerator portion of expression (7).

The denominator portion of expression (7) is achieved by first multiplying $\overline{l^2}$ by $\overline{r^2}$ in a multiplier 26 and squaring $\overline{rl}$ in a multiplier 27. The output of multiplier 27 is then subtracted in a subtractor 28 from the output of multiplier 26 to produce the denominator portion.

Finally, the output of subtractor 28 is divided into the output of multiplier 25 by divider 29 to produce the output $s_o$.

Figure 2:
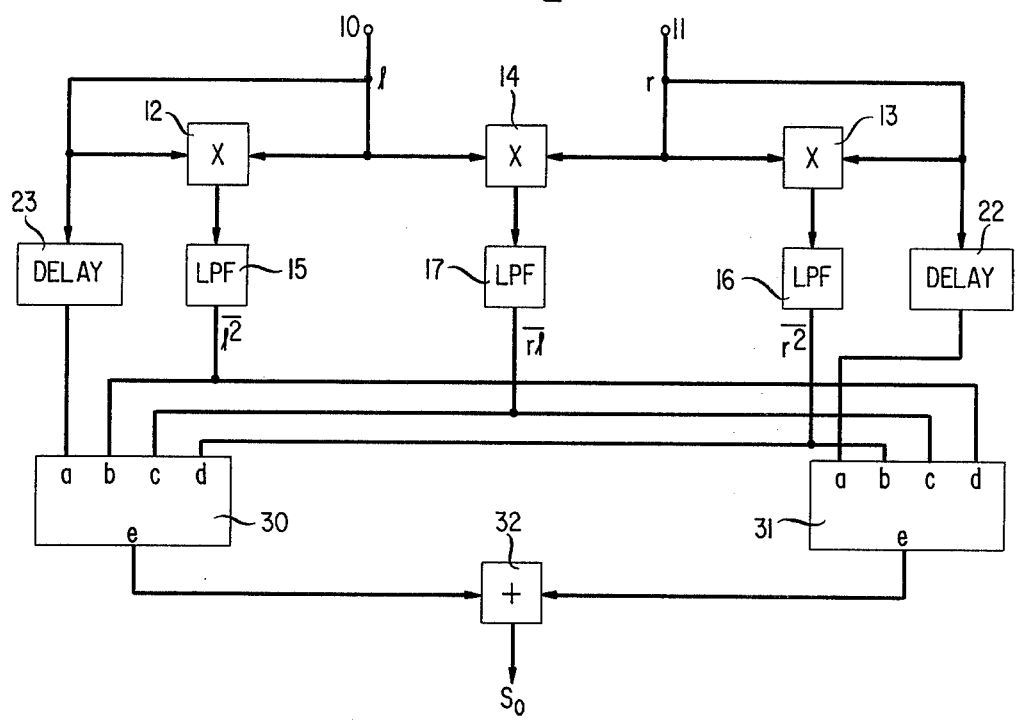

Other embodiments of the invention are also possible. Consider, for example, the order of the processing as set forth in expression (7a). This may be implemented as shown in FIG. 2. In FIG. 2, the values $\overline{l^2}$, $\overline{r^2}$ and $\overline{rl}$ are all derived as in FIG. 1. The outputs of delay device 23 and low pass filters 15, 16 and 17 are all applied to block 30 while the outputs of delay device 22 and low pass filters 15, 16 and 17 are all applied to block 31. The outputs of blocks 30 and 31 are summed in a summer 32 whose output comprises $s_o$. Blocks 30 and 31 perform the two fractional processes, respectively, set forth in expression (7a).

Figure 3:
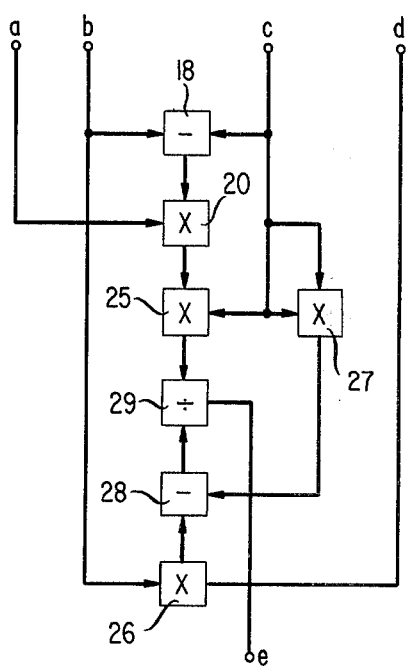
FIGS. 3 and 4 are block diagrams of structure which may be used in the embodiment depicted by FIG. 2, and FIGS. 5, 6 and 7 show various ways in which embodiments of the invention may be combined.
Figure 4:
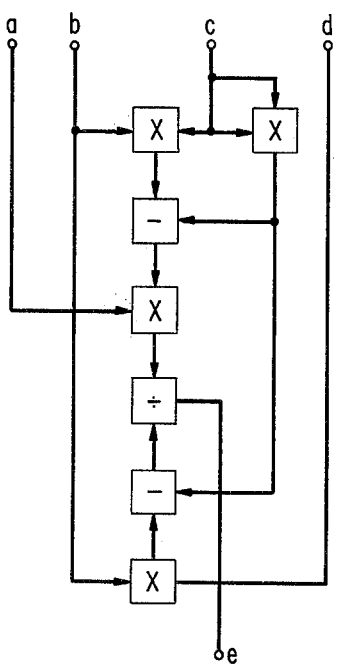

Block 30 and 31 may take any one of a number of forms, including those disclosed in FIGS. 3 and 4. The structure of FIG. 3 may be made up, for example, of elements 18, 20, 25, 27, 29, 28 and 26 of FIG. 1. The arrangement of FIG. 4 differs from that of FIG. 3 in that the organization of the three uppermost elements has been changed as if the $\overline{rl}$ and parenthetical portions of expression (7a) were multiplied together.

The embodiment of FIG. 1 may be preferred to that of FIG. 2 because it requires less elements than used in the embodiment of FIG. 2. This occurs because FIG. 1 combines blocks 30 and 31 of FIG. 2. On the other hand, the embodiment of FIG. 2 may be preferable in some instances for other reasons, such as manufacturing.

The various circuits represented by the blocks in the FIGS. may be either of an analog or digital nature. When the contaminated signals are of an analog nature and it is desired to use digital circuits, the contaminated signals are first converted to a digital form by passing them through conventional analog-to-digital converters prior to application to ports 10 and 11. In this case, the output $s_o$ is in a digital form but may be converted back into an analog form through the use of a conventional digital-to-analog converter. Such techniques are appreciated by those skilled in the art.

The moving average outputs produced by filters 15, 16 and 17 are relatively short term values. The following discussion relating to the processing of speech signals serves as an example.

Speech is a nonstationary process. In particular, it is a process whose power fluctuates rapidly at syllabic rates (ca. 10 Hz). Thus, by using an averaging time of about 20 msec, a better estimate of the syllabic signal power is obtained than by either much longer or shorter averaging times. The same is true for the estimates of the noise powers, particularly, if the noise is actually interfering speech or a babble of voices.

In order to get a rough idea of the effect of nonstationarity, one may assume that a speech signal of long-time average power S has actually zero amplitude two-thirds of the time and power 3S the remaining one-third of the time. The noise power in the averaged microphone signals $\sigma 2$, when the speech signal is on, equals $(R+L)/4$. When the signal is off, the noise is also essentially switched off. Thus, the average noise power is $$\overline{N} = (R+L)12 .$$

The corresponding SNR is
$$\overline{S}/\overline{N} = 12\ S/(R+L)$$

compared to $4S/(R+L)$ for the stationary case. Thus, there is an additional improvement in SNR of about 5dB due to nonstationarity. The total SNR improvement is 8 dB compared to the SNR of a single microphone and $R = L$.

The above averaging time of 20 msec was used in digital simulations in a computer. The advantage in simulating is that the noise and speech levels may be accurately controlled for testing purposes. In the performed simulations, equal noise levels and equal speech levels were applied to both channels. Because of the nonstationary character of speech signals, the SNR improvement obtained was actually larger than that predicted for stationary signals (3dB). Listening to these particular simulations suggests that the improvement is even greater than 8 dB, i.e., there is a subjective as well as an objective improvement. This is probably because there is little noise when it would be most audible — namely during low-level or silent speech intervals during which the factor $\overline{rl}$ approaches zero. In fact, it is well known that for equal average noise powers, a noise whose power fluctuates in synchrony with the syllabic speech power — as it does at the output of the processor described here — is less subjectively objectionable ("sounds less noisy") than a stationary noise.

Figure 5:
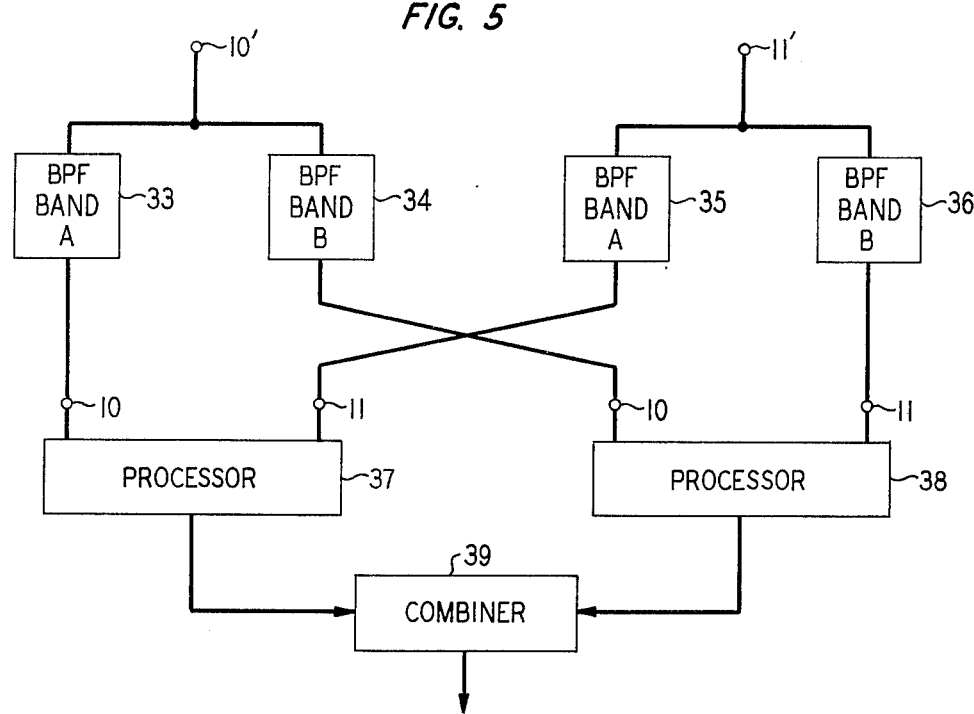

In some applications of the present invention, it may be advantageous to divide the channel signals into pluralities of signals residing in contiguous frequency bands, to use a like plurality of embodiments of the invention to process like frequency-band signals and to sum the resulting outputs for the embodiments. This is shown in FIG. 5 wherein channel signals on inputs 10' and 11' are divided into frequency bands A and B by bandpass filters 33, 34, 35 and 36. Those portions of the channel signals in frequency band A are applied to a processor 37 while those portions in frequency band B are applied to a processor 38. These processors are each constructed in accordance with the present invention. The outputs of processors 37 and 38 are combined in a combiner 39. This approach may be found, for example, to be a desirable way to introduce controlled delay and amplification to produce like signals prior to application to processors 37 and 38; i.e., once divided into such frequency bands, delay and/or amplification may be applied over limited frequency ranges to cause the signal contents in corresponding bands to be substantially equal prior to processing. This approach may also be found to be desirable in that the individual embodiments are not required to be operable over the frequency range of the channel signals.

Figure 6:
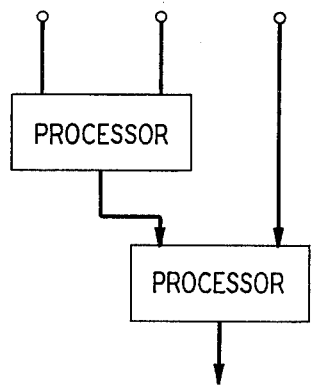
Figure 7:
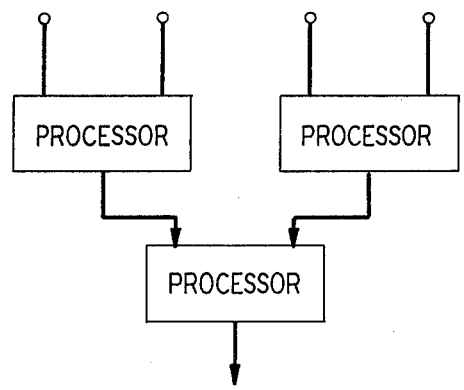

Embodiments of the invention may also be used with more than two channel signals to achieve still greater signal-to-noise ratios. FIGS. 6 and 7 show combinations of processors being used to combine like signals over three and four channels, respectively. In FIG. 6, two channel inputs are processed in a first processor while its output and the third channel signal are processed in a second processor. In FIG. 7, two channel signals are processed in a first processor, the remaining two channel signals are processed in a second processor and the outputs of the first and second processors are processed in a third processor. Larger numbers of channel signals may similarly be accommodated. In these combinations, delay and amplification control of the inputs to the various processors may have to be introduced to produce like signal inputs to any given processor as previously discussed in detail.

What is claimed is:

1. A combination of processing two substantially identical signals contaminated by uncorrelated noise to produce an output having a greater signal-to-noise ratio than either of said signals contaminated by noise, said combination comprising:
   first means for receiving said signals contaminated by noise to produce the quantities $\overline{l^2}$, $\overline{r^2}$ and $\overline{rl}$, where the symbols $l$ and $r$ represent the instantaneous amplitudes of said two signals contaminated by noise, respectively, and the bars over said symbols indicate moving averages of the quantities represented by said symbols, and
   second means connected to said first means for combining said instantaneous amplitudes represented by said symbols $r$ and $l$ and said quantities $\overline{l^2}$, $\overline{r^2}$ and $\overline{rl}$ in the following manner $$\frac{\overline{rl}[(\overline{l^2} - \overline{rl})r + (\overline{r^2} - \overline{rl})l]}{\overline{r^2}\overline{l^2} - (\overline{rl})^2}$$

2. A combination in accordance with claim 1 in which said first means comprises:
   a first multiplier for multiplying said amplitude $l$ by itself,
   a second multiplier for multiplying said amplitude $r$ by itself,
   a third multiplier for multiplying said amplitude $r$ by said amplitude $l$, and
   first, second and third low pass filters connected to the outputs of said first, second and third multipliers, respectively, for producing moving averages of the quantities $l^2$, $r^2$ and $rl$.

3. A combination in accordance with claim 2 in which said second means comprises:
   third means connected to said first, second and third filters for combining the instantaneous amplitudes represented by $l$ and $r$ and the quantities $\overline{l^2}$, $\overline{r^2}$ and $\overline{rl}$ in the following manner $$\overline{rl}[(\overline{l^2} - \overline{rl})r + (\overline{r^2} - \overline{rl})l],$$

fourth means connected to said first, second and third filters for combining the quantities $\overline{l^2}$, $\overline{r^2}$ and $\overline{rl}$ in the following manner $$\overline{r^2}\,\overline{l^2} - (\overline{rl})^2, \text{ and}$$

fifth means connected between said third and fourth means for dividing the output of said fourth means into the output of said third means.

4. A combination in accordance with claim 2 in which said second means comprises:
   a first substractor connected to said first and third filters for producing the quantity $\overline{l^2} - \overline{rl}$,
   a second subtractor connected to said second and third filters for producing the quantity $\overline{r^2} - \overline{rl}$,
   a fourth multiplier connected for multiplying the quantity $\overline{l^2} - \overline{rl}$ by the instantaneous amplitude represented by $r$,
   a fifth multiplier connected for multiplying the quantity $\overline{r^2} - \overline{rl}$ by the instantaneous amplitude represented by $l$,
   a summer for combining the outputs of said fourth and fifth multipliers,
   a sixth multiplier connected between said third filter and said summer for producing the product $$\overline{rl}[(\overline{l^2} - \overline{rl})r + (\overline{r^2} - \overline{rl})l],$$

a seventh multiplier connected to said first filter and said second filter for producing the quantity $\overline{r^2}\,\overline{l^2}$,
an eighth multiplier for multiplying the output of said third filter by itself,
a third subtractor connected between said seventh and eighth multipliers for producing the quantity $\overline{r^2}\,\overline{l^2} - (\overline{rl})^2$, and
a divider for dividing the output of said sixth multiplier by the output of said third divider.

5. A combination in accordance with claim 2 in which said third means comprises:
   a fourth means connected to said first, second and third filters for combining said instantaneous amplitude represented by with said quantities $\overline{l^2}$, $\overline{r^2}$ and $\overline{rl}$ in the following manner $$\frac{\overline{rl}\,(\overline{l^2} - \overline{rl})\,r}{\overline{r^2}\,\overline{l^2} - (\overline{rl})^2},$$

a fifth means connected to said first, second and third filters for combining said instantaneous amplitude represented by $r$ with said quantities $\overline{l^2}$, $\overline{r^2}$ and $\overline{rl}$ in the following manner $$\frac{\overline{rl}\,(\overline{r^2} - \overline{rl})\,l}{\overline{r^2}\,\overline{l^2} - (\overline{rl})^2},$$

sixth means for summing the outputs of said fourth and fifth means.

6. The method of processing first and second noise contaminated signals, when said signals exclusive of noise are substantially identical, to produce an output signal having a signal-to-noise ratio greater than that of either of said first and second contaminated signals, said method comprising the steps of:

producing first and second quantities equal to the squares of the instantaneous amplitudes of said first and second contaminated signals, respectively, producing a third quantity equal to the product of said instantaneous amplitudes of said first and second contaminated signals, producing moving averages of said first second and third quantities, respectively, and combining said instantaneous amplitudes and said moving averages to produce the product of 1. a fourth quantity equal to said average of said third quantity divided by the product of said averages of said first and second quantities minus the square of the average of said third quantity and
2. a fifth quantity equal to said average of said first quantity times said second contaminated signal amplitude minus said average of said third quantity times the sum of said first and second contaminated signal amplitudes plus said average of said second quantity times said first contaminated signal amplitude.

* * * * *